(12) United States Patent
Sohmshetty et al.

(10) Patent No.: US 11,447,033 B2
(45) Date of Patent: Sep. 20, 2022

(54) STACKABLE BATTERY APPARATUSES AND METHODS OF USE

(71) Applicant: Ford Global Technologies, LLC, Dearborn, MI (US)

(72) Inventors: Raj Sohmshetty, Canton, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 577 days.

(21) Appl. No.: 16/570,980

(22) Filed: Sep. 13, 2019

(65) Prior Publication Data

US 2020/0001738 A1 Jan. 2, 2020

Related U.S. Application Data

(63) Continuation-in-part of application No. PCT/US2018/042943, filed on Jul. 19, 2018.

(60) Provisional application No. 62/543,883, filed on Aug. 10, 2017, provisional application No. 62/536,897, filed on Jul. 25, 2017, provisional application No. 62/534,640, filed on Jul. 19, 2017.

(51) Int. Cl.
| | | |
|---|---|---|
| *B60L 53/80* | (2019.01) | |
| *B64C 39/02* | (2006.01) | |
| *B60L 50/60* | (2019.01) | |
| *H01M 10/44* | (2006.01) | |
| *B64F 5/40* | (2017.01) | |
| *B64D 27/24* | (2006.01) | |
| *B60L 53/67* | (2019.01) | |
| *B60L 50/64* | (2019.01) | |
| *B60L 53/53* | (2019.01) | |
| *B60L 53/36* | (2019.01) | |
| *B60L 58/10* | (2019.01) | |
| *H01M 50/20* | (2021.01) | |

(52) U.S. Cl.
CPC ............ *B60L 53/80* (2019.02); *B60L 50/64* (2019.02); *B60L 50/66* (2019.02); *B60L 53/36* (2019.02); *B60L 53/53* (2019.02); *B60L 53/67* (2019.02); *B60L 58/10* (2019.02); *B64C 39/024* (2013.01); *B64D 27/24* (2013.01); *B64F 5/40* (2017.01); *H01M 10/441* (2013.01); *H01M 50/20* (2021.01); *B60L 2200/10* (2013.01); *B64C 2201/042* (2013.01); *H01M 2220/20* (2013.01)

(58) Field of Classification Search
CPC .......... B60L 53/80; B60L 53/67; B60L 50/64; B60L 50/66; B60L 53/53; B60L 53/36; B60L 58/10; B60L 58/22; B60L 50/60; B64F 5/40; H01M 50/20; H01M 10/441; H01M 2220/20; H01M 10/44; B64C 39/024; B64C 2201/10; B64C 39/02; B64D 27/24
See application file for complete search history.

*Primary Examiner* — Robert L Deberadinis
(74) *Attorney, Agent, or Firm* — Brandon Hicks; Eversheds Sutherland (US) LLP

(57) ABSTRACT

Landing apparatuses for unmanned aerial vehicles are provided herein. An example battery assembly can include a housing having a top surface, and a bottom surface, wherein the bottom surface of the housing having a receiving interface that receives a first protruding adapter of an associated object. The top surface of the housing having a second protruding adapter that mates with the receiving interface of a second battery assembly, an energy storage unit disposed within the housing, a locking mechanism disposed within the housing, a biasing member that places the locking mechanism in a locked configuration, and a controller having a processor and memory for storing instructions, the processor being configured to execute the instructions to cause the locking mechanism to move into an unlocked configuration.

20 Claims, 4 Drawing Sheets

STACKABLE BATTERY APPARATUSES AND METHODS OF USE

CROSS-REFERENCE TO RELATED APPLICATIONS

The present disclosure claims priority to, the benefit of, and is a continuation-in-part of PCT/US2018/042943, filed Jul. 19, 2018, which claims priority to U.S. provisional patent application No. 62/534,640, filed Jul. 19, 2017, U.S. provisional patent application No. 62/536,897, filed Jul. 25, 2017, and U.S. provisional patent application No. 62/543,883, filed Aug. 10, 2017, which are all hereby incorporated by reference herein in their entireties for all purposes.

TECHNICAL FIELD

The present disclosure relates to rechargeable or swappable batteries and in some embodiments to stackable battery apparatuses that include locking mechanisms for locking and unlocking stacked battery assemblies.

BACKGROUND

Many systems, such as unmanned aerial vehicles (UAV) or autonomous cars, rely on batteries or other selectively replaceable energy storage units. Some of these devices rely on rechargeable batteries or utilize swappable batteries. A user is required in order to exchange an expended battery with a new or recently recharged battery.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed, in some embodiments, to battery assemblies that are configured to be stacked together and which include locking mechanisms. In some instances, a battery assembly may include a protruding adapter that mates with a receiving interface of an associated object such as a base member or another battery assembly. The battery assembly may also include a receiving interface that mates with a protruding interface of an associated object such as a base member or another battery assembly.

The locking mechanism can secure two battery assemblies together. In some embodiments the locking mechanism can secure a battery assembly to a base member. In various embodiments, the locking mechanism can include a single blade or a plurality of blades arranged to form an axisymmetric locking member (e.g., an adjustable aperture). The size of the axisymmetric locking member can change based on relative movement of the plurality of blades. This allows the axisymmetric locking member to expand or contract to lock or unlock with a protruding adapter of another battery assembly or a base member. Some embodiments include the base member that functions as a charging station for the battery assemblies. In some instances, the locking member is not axisymmetric.

The base member can be adapted to receive a battery assembly or a stack of battery assemblies of the present disclosure. For example, the base member can also include a protruding adapter, such as the protruding adapter found on the battery assembly. The base member can also be configured to charge a stack of battery assemblies using a charging strategy. In some embodiments, a plurality of battery assemblies can be stacked together and each of the plurality of battery assemblies is identically constructed.

In one or more embodiments, the UAV may be adapted to pick up and drop off a battery assembly from the base member. In one embodiment, the UAV may be adapted to charge a main or primary battery of the UAV with one of the battery assemblies.

Illustrative Embodiments

Figure 1:
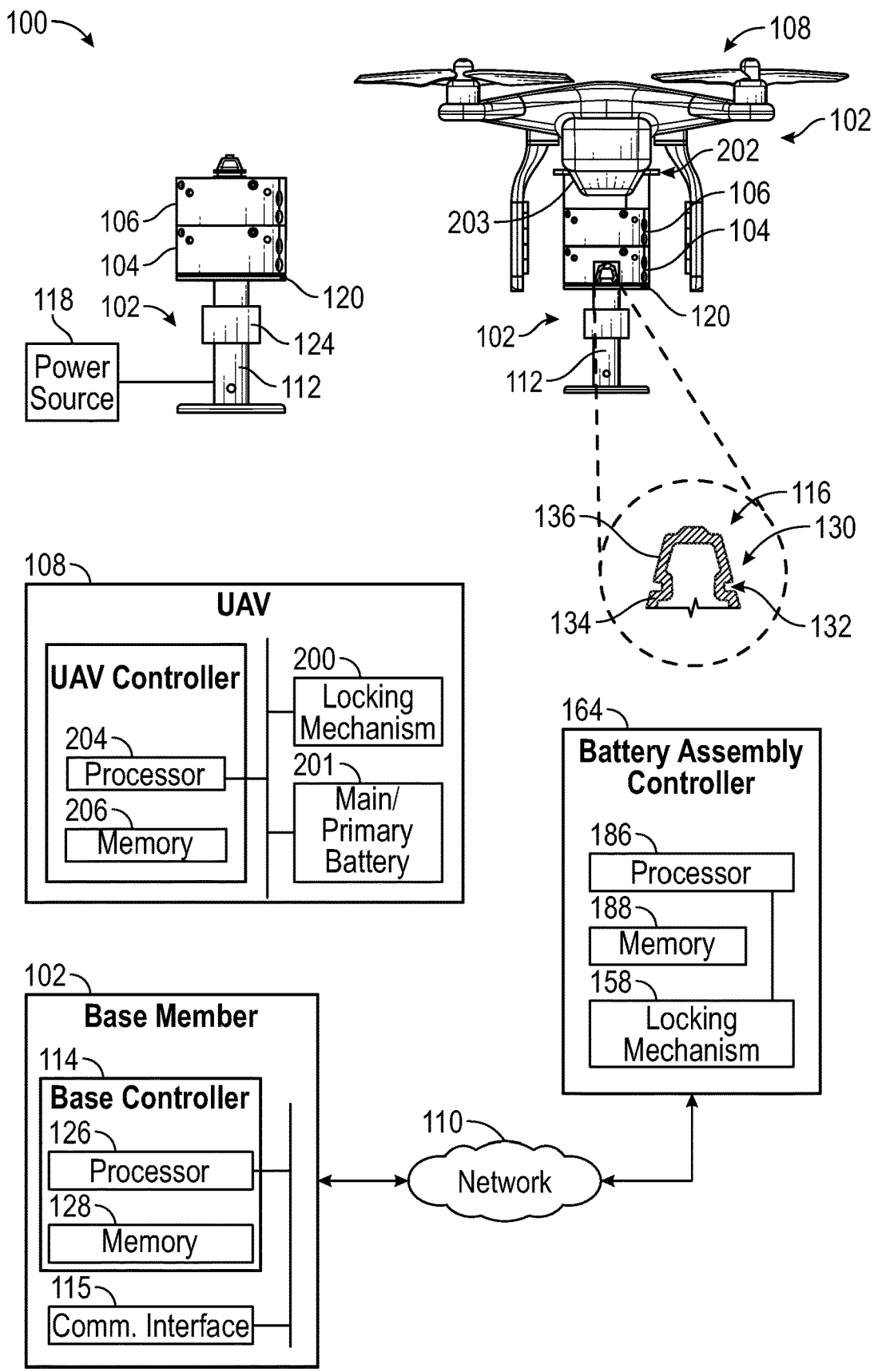
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a base member 102, one or more battery assemblies, such as a first battery assembly 104 and a second battery assembly 106, and an unmanned aerial vehicle (UAV 108). In some embodiments, the components of FIG. 1 can communicate using a network 110. The network 110 may include any one or a combination of multiple different types of networks, such as cable networks, the Internet, wireless networks, and other private and/or public networks. In some instances, the network 110 may include cellular, Wi-Fi, or Wi-Fi direct.

Figure 2A:
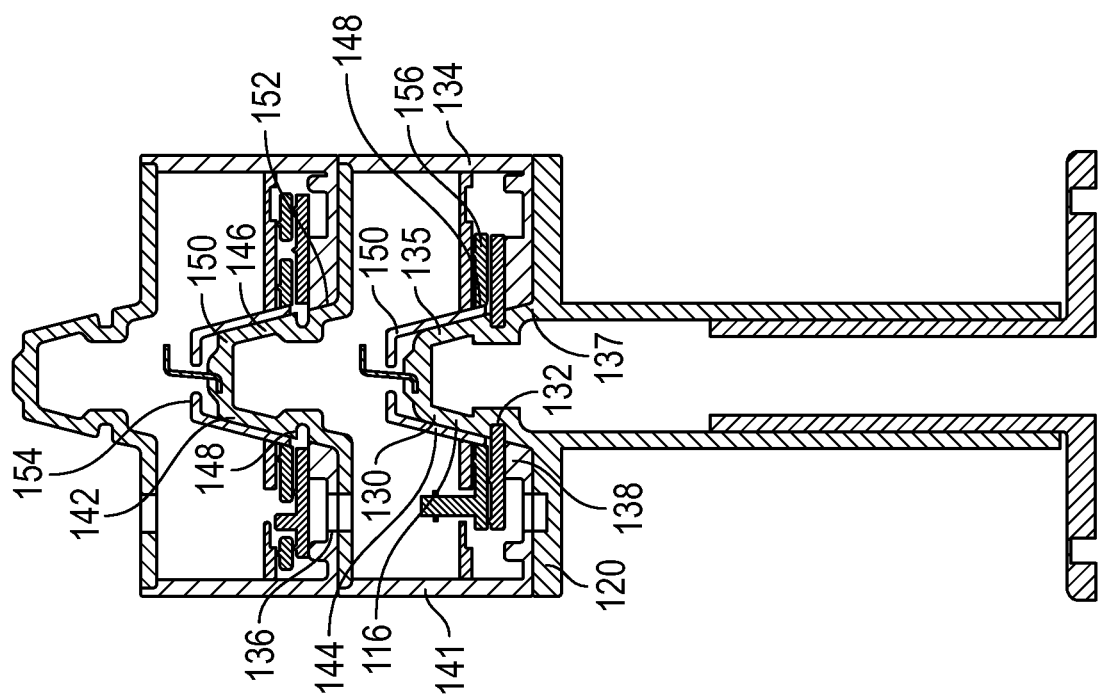
FIG. 2A depicts a cross-section of a base member and battery assemblies of the present disclosure in a locked configuration.
Figure 2B:
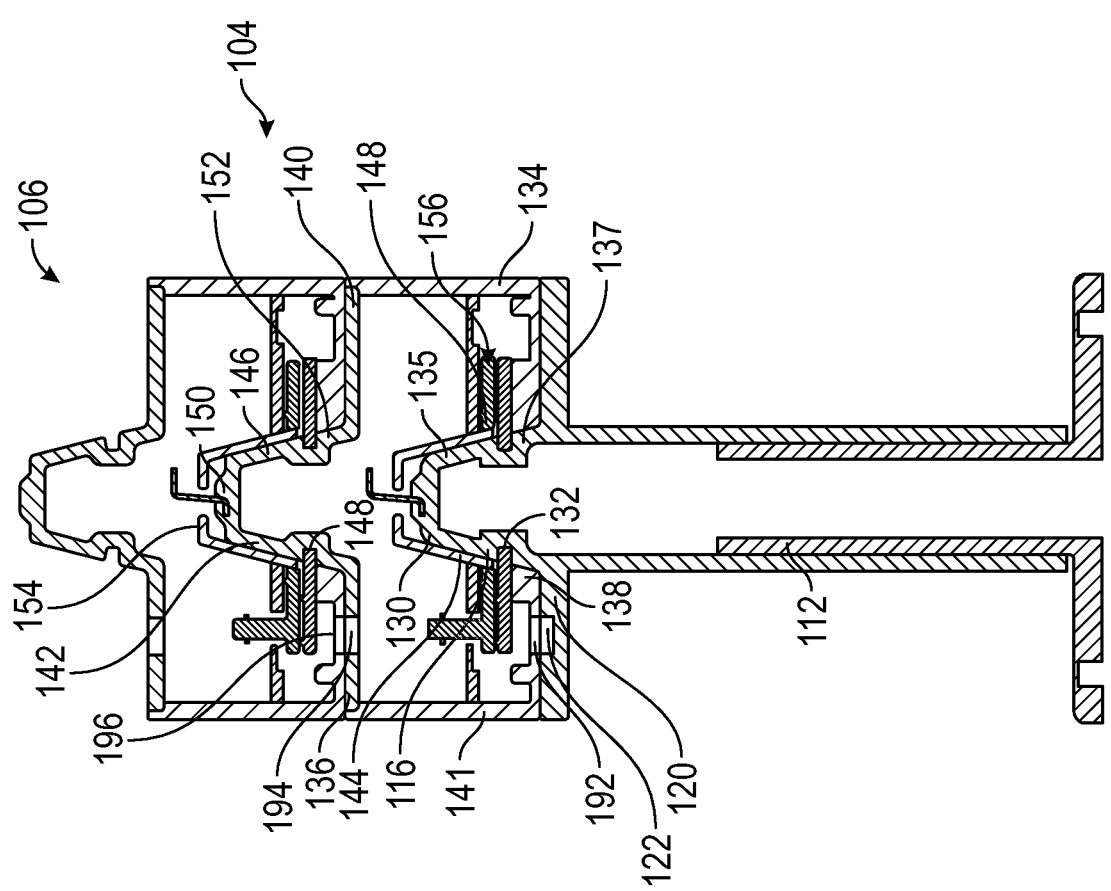
FIG. 2B depicts a cross-section of a base member and battery assemblies of the present disclosure in an unlocked configuration.

Referring now to FIGS. 1 and 2A-2B collectively, the base member 102 functions as a charging station for charging the one or more battery assemblies stacked onto the base member 102. In some embodiments, the base member 102 may include a support shaft 112 and a base controller 114. The support shaft 112 can comprise a terminal end that has a first protruding adapter 116. In various embodiments, the base member 102 can couple with a power source 118. In one embodiment, the power source 118 can include continuous utility or infrastructure power. In some embodiments, the power source 118 includes an energy storage device, such as a battery. In various embodiments, the power source 118 can include both utility or infrastructure power and an energy storage device.

In various embodiments, the base member 102 includes a plate 120 that incorporates a charging adapter 122. The charging adapter 122 can be used to transfer energy to a battery assembly through from the power source 118. In one embodiment, the first battery assembly 104 is disposed on the plate 120 and receives electrical energy from the power source 118 through the charging adapter 122 (see FIGS. 2A and 2B). Additional details on the first battery assembly 104 are provided in greater detail herein.

In one or more embodiments, the support shaft 112 comprises a damper 124 that can reduce forces created by the UAV 108 when dropping off or picking up a battery assembly. The damper 124 could include a spring, a bushing, a cushion, or any other similar mechanical or hydraulic device designed to absorb and damp shock impulses. In various embodiments, the support shaft 112 may extend or retract to raise or lower the first protruding adapter 116. For example, the support shaft 112 could use telescoping to extend or retract.

In some embodiments, the base controller 114 may comprise a processor 126 and memory 128. The memory 128 stores instructions that can be executed by the processor 126 to perform battery charging processes or schemes. When referring to operations executed by the base member 102 or controller 114, it will be understood that this includes the execution of instructions by the processor 126. In some embodiments, the base controller 114 may be configured to charge stacked battery assemblies on a last-in-first-charged basis. For example, when the first battery assembly 104 is placed onto the base member 102 first, and the second battery assembly 106 is stacked on the base member 102 last, the base controller 114 can be configured to charge the second battery assembly 106 first before charging the first battery assembly 104. Also, in some embodiments, the base controller 114 can be configured to cause the first battery assembly 104 (or other battery assemblies) to lock or unlock. Thus, the base member 102 can also comprise a communications interface 115 that allows the base member 102 to send or receive data over the network 110. As will be discussed in greater detail, the base member 102 may be configured to communicate with battery assemblies, and/or the UAV 108. For example, the base member 102 may communicate with the UAV 108 to allow the UAV 108 to pick up or drop off battery assemblies from the base member 102.

In various embodiments, the first protruding adapter 116 includes a substantially-conically shaped member having a sidewall 130. The sidewall 130 is subdivided into two portions by a circumferential groove 132. In some embodiments, the circumferential groove 132 separates a first portion 135 of the sidewall 130 from a second portion 137 of the sidewall 130. To be sure, the specific shape and configuration of the first protruding adapter 116 can vary according to design preferences. Thus, while a generally conical or frusto-conical shape is illustrated and described, other shapes can also be utilized. In general, the location of the circumferential groove 132 may be dictated (in part) by a location of a locking mechanism of a battery assembly when the battery assembly is docked with the base member 102. Generally, the circumferential groove 132 may align with the locking mechanism of a battery assembly when the battery assembly is docked with the base member 102, as will be discussed in greater detail infra.

Turning now to specifics regarding the first battery assembly 104, it will be generally understood that the first battery assembly 104 and the second battery assembly 106 can be constructed identically to one another. Thus, descriptions of the first battery assembly 104 are equally applicable to the second battery assembly 106.

The first battery assembly 104 can comprise a housing 134 having a top surface 136 and a bottom surface 138 that are spaced apart from one another by a sidewall 141. While the configuration of the housing 134 is generally cylindrical, other housing shapes can be utilized. In various embodiments, the housing 134 may include a second protruding adapter 142 and a receiving interface 144. The second protruding adapter 142 and the receiving interface 144 have generally complementary shapes. In some embodiments, the second protruding adapter 142 can be configured identically to the first protruding adapter 116 of the base member 102.

Thus, the second protruding adapter 142 may include a substantially conically shaped member having a sidewall 146. The sidewall 146 can be subdivided into two portions by a circumferential groove 148. In some embodiments, the circumferential groove 148 separates a first portion 150 of the sidewall 146 from a second portion 152 of the sidewall 146. To be sure, the specific shape and configuration of the second protruding adapter 142 can vary according to design preferences. Thus, while a conical shape is described and illustrated, other shapes can also be utilized.

In operation, the second protruding adapter 142 can be configured to nest within the receiving interface of another battery assembly. For example, the second protruding adapter 142 can nest within a receiving interface 154 of the second battery assembly 106.

Likewise, the receiving interface 144 of the first battery assembly 104 can mate with the first protruding adapter 116 of the base member 102 (or a protruding adapter of another battery assembly if the first battery assembly 104 is stacked on another battery assembly rather than the base member 102). Stated otherwise, the receiving interface 144 of the first battery assembly 104 can mate with a protruding adapter of an associated object. The associated object could be either the base member 102 or another battery assembly.

In some embodiments, the receiving interface 144 is a concave member having a shape that generally corresponds to the shape of a protruding adapter (such as the second protruding adapter 142. In various embodiments, the receiving interface 144 comprises a slot 156 or series of slots. The slot 156 may align with a circumferential groove of a protruding adapter. For example, the slot 156 may align with the circumferential groove 132 of the first protruding adapter 116. When aligned, a locking member or mechanism can extend through the slot 156 and into the circumferential groove 132, which creates a securement or locking there between. Additional details on locking and unlocking of battery assemblies will be discussed in greater detail below with reference to FIGS. 3A-3B and FIGS. 4A and 4B specifically. In general, the second battery assembly 106 is in a locked state relative to the second battery assembly 104 in FIG. 2A, whereas the second battery assembly 106 is in an unlocked state relative to the second battery assembly 104 in FIG. 2B.

Figure 3A:
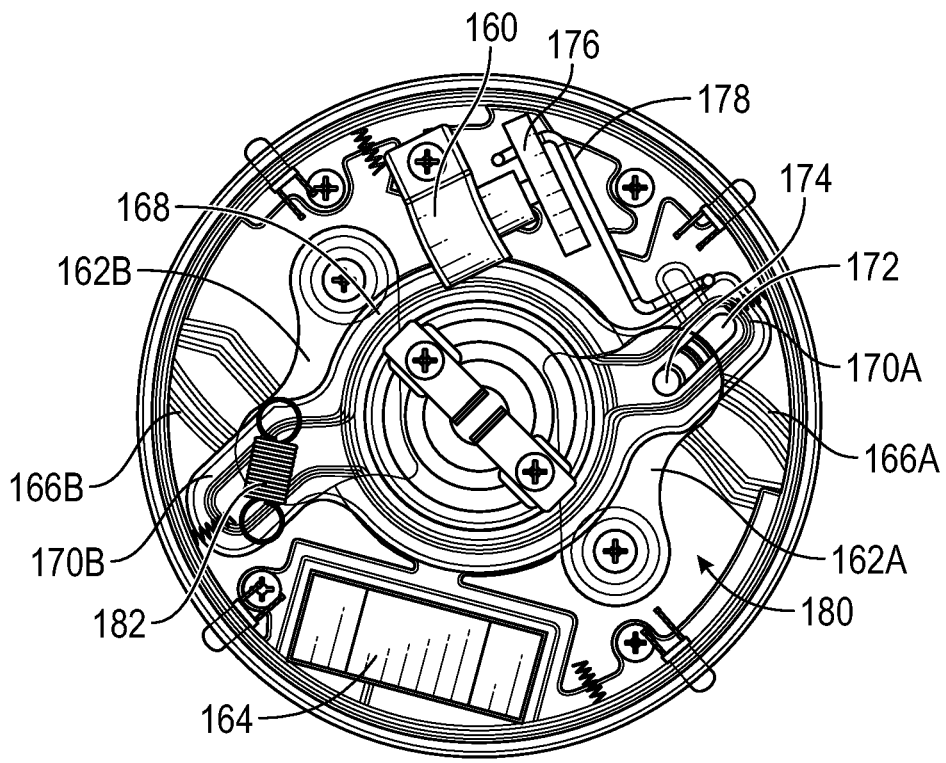
FIGS. 3A-3C collectively illustrate an example locking mechanism for use in accordance with the present disclosure.
Figure 3B:
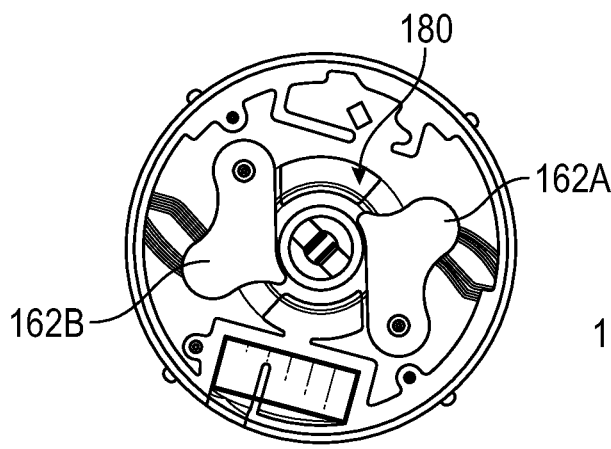
Figure 3C:
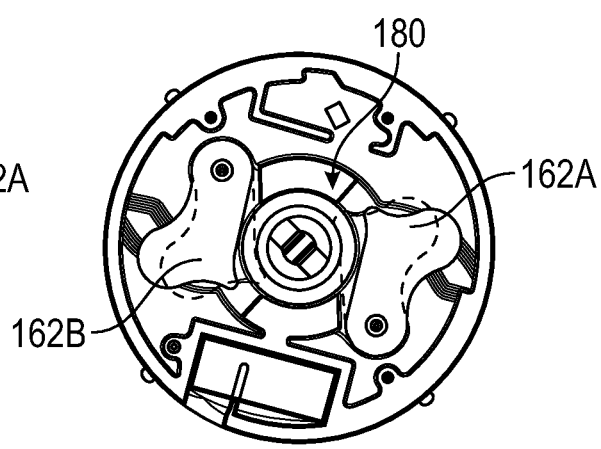

Referring now to FIGS. 3A-3C collectively, an example locking mechanism 158 is illustrated that includes an actuator 160 and one or more locking elements 162A and 162B, such as locking blades. The actuator 160 may include an electric motor that is controlled by a battery assembly controller 164. Other actuators that provide the requisite translation of the one or more locking elements 162A-162B can also be utilized. With regard to the locking elements, while some embodiments include three locking elements, other embodiments can include additional or fewer locking elements. For example, in one embodiment the locking mechanism can include a single locking element. Also, it will be understood that while the embodiments related to FIGS. 3A-3B reference the use of locking blades, locking members of other geometrical configurations can also be utilized. For example, the locking mechanism could include locking pins that insert into the circumferential groove of a protruding adapter. Also, rather than having a circumferential groove, a protruding adapter could also be configured to have slots, notches, or holes that receive the locking pins.

In some embodiments, each of the locking elements 162A-162B can be disposed on an arcuate track. For example, locking element 162A is associated with an arcuate track 166A, while locking element 162B is associated with an arcuate track 166B. Each of the locking elements 162A-162B can be coupled to a central carriage 168. The central carriage 168 is associated with the slot 156 of the receiving interface 144 (see FIGS. 2A and 2B). The central carriage 168 comprises armatures 170A and 170B in some embodiments. The locking elements can be associated with the armatures using a track and pin configuration. For example, armature 170A can include a track 172 that receives a pin 174 disposed on the locking element 162A. In order to actuate the locking elements 162A-162B, the actuator 160 is coupled to the central carriage 168 through a flywheel 176 and shaft 178. The actuator can rotate the flywheel 176, which in turn translates the shaft 178. The shaft 178 drives movement of the central carriage 168, which in turn causes the locking element 162A to traverse along the arcuate track 166A. Corresponding movement of the locking element 162B is also accomplished in a similar manner.

Referring now to FIGS. 1, 3A, and 3B collectively, according to some embodiments, the locking elements 162A-162B may surround the receiving interface 144 of the housing 134. In various embodiments, the locking elements 162A-162B can be aligned with the slot 156 of the receiving interface 144. In some embodiments, the locking elements 162A-162B form an axisymmetric locking member 180.

In some embodiments, the axisymmetric locking member 180 can expand and contract based on the relative movement of the locking elements 162A-162B (caused through use of the central carriage 168). In FIG. 3A the axisymmetric locking member 180 is in a locked configuration and in FIG. 3B the axisymmetric locking member 180 is in an unlocked configuration.

The axisymmetric locking member 180 can contract to and engage with the slot 156 of the receiving interface 144. Likewise, the axisymmetric locking member 180 can expand and disengage from the slot 156 of the receiving interface 144. In one example embodiment, when the first protruding adapter 116 of the base member 102 is nested within the receiving interface 144 of the housing 134, the actuator 160 can be controlled to cause the axisymmetric locking member 180 to contract. This contraction causes the locking elements 162A-162B to slide into the slot 156 of the receiving interface 144 and lock the first battery assembly 104 to the base member 102. If in a locked configuration, the actuator 160 can be controlled to cause the axisymmetric locking member 180 to expand. This expansion causes the locking elements 162A-162B to be removed from the slot 156 of the receiving interface 144 and unlock the first battery assembly 104 from the base member 102.

In one or more embodiments, the axisymmetric locking member 180 can be biased into a locked/contracted configuration by a biasing member 182, such as a spring. The actuator 160 may be used to expand/unlock the axisymmetric locking member 180. Due to the resilient biasing provided by the biasing member 182, when the first battery assembly 104 is placed onto the first protruding adapter 116 of the base member 102, the conical shape of the first protruding adapter 116 forces the axisymmetric locking member 182 to expand. When the slot 156 of the receiving interface 144 and the circumferential groove 132 of the first protruding adapter 116 align, the axisymmetric locking member 180 slides into the circumferential groove 132 of the first protruding adapter 116 due to the biasing member 182. In this embodiment, the actuator 160 may be used to expand/unlock the axisymmetric locking member 180 when the first battery assembly 104 is needed by the UAV 108 (see FIG. 1). The use of a biasing member 182 may ensure fail-safe locking. That is, when battery assemblies are stacked, the biasing member 182 causes the axisymmetric locking member 180 to automatically lock two battery assemblies together (or a battery assembly at the base member 102) without using the actuator 160.

The actuator 160 may include an electric motor that is controlled by a battery assembly controller 164. The battery assembly controller 164 can comprise a processor 186 and memory 188. The memory 188 stores instructions that can be executed by the processor 186 to control the locking mechanism 158. When referring to operations executed by the battery assembly controller 164, it will be understood that this includes the execution of instructions by the processor 186. In some embodiments, the battery assembly controller 164 can be used to cause the axisymmetric locking member 180 to expand or contract through control of the actuator 160, as noted above.

In some embodiments, the battery assembly controller 164 can expand or contract the axisymmetric locking member 180 to lock or unlock a battery assembly upon request from the UAV 108. For example, the UAV 108 can transmit a signal or message to the battery assembly controller 164 to unlock an available battery assembly. Thus, in some embodiments, the first battery assembly 104 can comprise a communications interface that allows the battery assembly controller 164 to send or receive data over the network 110. In other embodiments, the battery assembly controller 164 can lock or unlock the axisymmetric locking member 180 based on signals or messages received from the base controller 114 of the base member 102.

Referring back to FIG. 2A, as noted above, the first battery assembly 104 can comprise an energy storage unit or assembly 190, a first charging interface 192, and a second charging interface 194. In some embodiments, the first charging interface 192 is an electrical conductor that is disposed on the bottom surface 138 of the housing 134. In some embodiments, the second charging interface 194 is an electrical conductor that is disposed on the top surface 140 of the housing 134. In various embodiments, the first charging interface 192 can electrically couple with the charging adapter 122 of the base member 102. In another embodiment, the first charging interface 192 a charging interface of another battery assembly. For example, when the first battery assembly 104 and the second batter assembly 106 are stacked, the first charging interface 192 can electrically couple with the charging adapter 122 of the base member 102. Also, the second charging interface 194 electrically couples with a first charging interface 196 of the second battery assembly 106.

In some embodiments, the base controller 114 can be configured to charge the stacked battery assemblies according to a charging scheme. In one example embodiment, the base controller 114 can charge the second battery assembly 106 before charging the first battery assembly 104. That is, when the first battery assembly 104 is electrically coupled to the base member 102 and the second battery assembly 106 is electrically coupled to the first battery assembly 104, the base controller 114 can cause electrical energy to bypass the first battery assembly 104 and charge an energy storage unit (not shown) of the second battery assembly 106. In some embodiments, the base controller 114 can charge stacked battery assemblies in a last-in-first-to-charge process (e.g., top to bottom order). In another embodiment, the base controller 114 can charge stacked battery assemblies in a first-in-first-to-charge process (e.g., bottom to top order).

Referring back to FIG. 1, the UAV 108 can be configured to pick up and release a battery assembly of the present disclosure. For example, the UAV 108 can comprise a locking mechanism 200 that is disposed on an underside of the UAV 108. The locking mechanism 200 can be controlled through a UAV controller 202. The UAV controller 202 can comprise a processor 204 and memory 206. The processor 204 can execute instructions stored in memory to control the locking mechanism 200 to lock or unlock a battery assembly to the UAV 108. To be sure, the locking mechanism 200 can include any of the locking mechanisms disclosed herein, such as the locking mechanism of FIGS. 3A and 3B or the locking mechanism of FIGS. 4A and 4B.

Also, in some embodiments, the UAV 108 may be adapted to charge a main or primary battery 201 of the UAV 108 with energy obtained from one of the battery assemblies of the present disclosure. For example, the UAV 108 could obtain energy from a third battery assembly 203 and use the same to charge the main or primary battery 201. Once expended the UAV 108 can drop the third battery assembly 203 onto the stack above the second battery assembly 106.

Figure 4A:
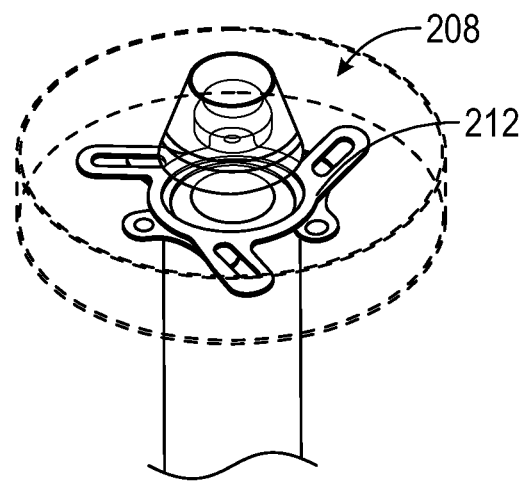
FIGS. 4A and 4B collectively illustrate another example locking mechanism for use in accordance with the present disclosure.
Figure 4B:
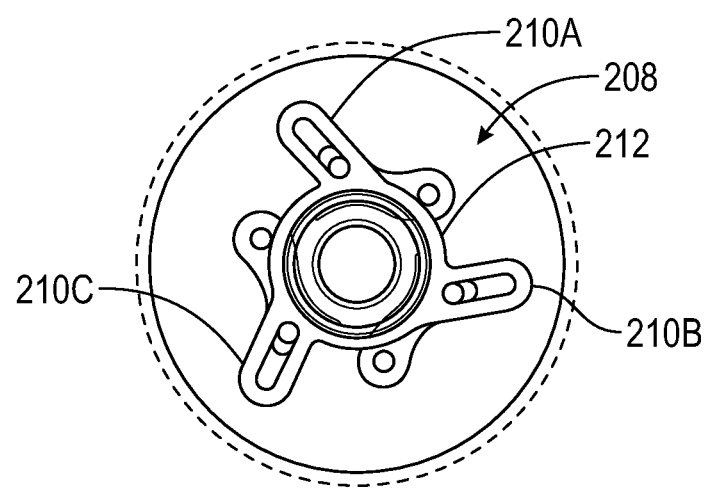

Referring now to FIGS. 4A and 4B which illustrates another example locking mechanism 208, which includes locking elements 210A-210C that form an axisymmetric locking member 212, can expand and contract (similar to a camera iris or other similar adjustable aperture). With regard to the locking elements, while some embodiments include three locking elements, other embodiments can include additional or fewer locking elements. For example, in one embodiment, the locking mechanism can include a single locking element. Also, it will be understood that while some embodiments reference the use of locking blades, locking members of other geometrical configurations can also be utilized. For example, the locking mechanism could include locking pins that insert into the circumferential groove of a protruding adapter. Also, rather than having a circumferential groove, a protruding adapter could also be configured to have slots, notches, or holes that receive the locking pins. In various embodiments, the 202A-202C can be actuated using mechanisms similar to those disclosed above with respect to FIGS. 3A-3C.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A battery assembly, comprising:
a housing having a first surface and a second surface, wherein the second surface of the housing comprises a receiving interface that mates with a first protruding adapter of an associated object, further wherein the first surface of the housing comprises a second protruding adapter that is configured to mate with the receiving interface of a second battery assembly;
an energy storage unit disposed within the housing;
a locking mechanism disposed within the housing; and
a controller having a processor and memory for storing instructions, the processor is configured to execute the instructions to cause the locking mechanism to disengage from the first protruding adapter so as to unlock the battery assembly from the associated object.

2. The battery assembly according to claim 1, wherein the first protruding adapter comprises a sidewall with a groove.

3. The battery assembly according to claim 2, wherein the locking mechanism of the first protruding adapter comprises a locking element that slides into the groove.

4. The battery assembly according to claim 2, wherein the locking mechanism comprises a plurality of locking elements, wherein a first of the plurality of locking elements is associated with an actuator coupled to the controller, the actuator is configured to translate the first of the plurality of locking elements between a locked position and an unlock position.

5. The battery assembly according to claim 4, wherein the locking mechanism comprises a plurality of locking elements, wherein the plurality of locking elements are coupled in such a way that translation of the first of the plurality of locking elements by the actuator causes translation of a remainder of the plurality of locking elements.

6. The battery assembly according to claim 5, wherein the locking mechanism comprises a plurality of locking elements that are arranged within the housing to form a locking member, wherein the controller is configured to cause the plurality of locking elements to translate so as to expand or contract the locking member.

7. The battery assembly according to claim 6, wherein the controller is configured to cause the plurality of locking elements to translate so as to expand the locking member to receive the first protruding adapter.

8. The battery assembly according to claim 7, wherein the controller is configured to contract the locking member to engage with a groove of the first protruding adapter, further wherein the controller is configured to expand the locking member to disengage the locking member from the groove.

9. The battery assembly according to claim 1, wherein the associated object comprises a base member having a charging adapter, and wherein the battery assembly further comprises a first charging interface associated with the second surface of the housing, the first charging interface configured to electrically couple with the charging adapter.

10. The battery assembly according to claim 9, further comprising a second charging interface associated with the first surface of the housing, the second charging interface configured to electrically couple with a third charging interface second battery assembly.

11. An apparatus, comprising:
a base member comprising a first protruding adapter and a charging adapter; and
a first battery assembly, comprising:
a housing having a first surface, and a second surface, wherein the second surface of the housing comprises a receiving interface that mates with a first protruding adapter of the base member, further wherein the first surface of the housing comprises a second protruding adapter that mates with the receiving interface of a second battery assembly;
an energy storage unit disposed within the housing;
a locking mechanism disposed within the housing; and
a controller having a processor and memory for storing instructions, the processor being configured to execute the instructions to cause the locking mechanism to:
engage with the first protruding adapter of the base member so as to lock the first battery assembly to the base member; and
disengage from the first protruding adapter of the base member so as to unlock the first battery assembly such that it can be removed from the base member.

12. The apparatus according to claim 11, wherein the base member comprises a controller having a processor and memory, the controller being configured to control charging of the energy storage unit.

13. The apparatus according to claim 12, further comprising the second battery assembly stacked on top of the first battery assembly, wherein the controller of the base member is configured to charge at least one of the first battery assembly or the second battery assembly.

14. The apparatus according to claim 13, wherein the controller of the base member is configured to charge the second battery assembly before charging the first battery assembly.

15. The apparatus according to claim 11, wherein the locking mechanism comprises a plurality of locking elements that are arranged within the housing to form a locking member, wherein the controller of the first battery assembly is configured to cause the plurality of locking elements to translate so as to expand or contract the locking member.

16. A system, comprising:
an unmanned aerial vehicle comprising a primary battery and receiver that receives a first battery assembly; and
a base member comprising a first protruding adapter and a charging adapter;
the first battery assembly, comprising:
a housing having a first surface and a second surface, wherein the second surface of the housing comprises a receiving interface that mates with either a base member or a second battery assembly, further wherein the first surface of the housing comprises a second protruding adapter that mates with the receiver of the unmanned aerial vehicle;
an energy storage unit disposed within the housing;
a locking mechanism disposed within the housing; and
a controller having a processor and memory for storing instructions, the processor being configured to execute the instructions to cause the locking mechanism to:
engage with the first protruding adapter of the base member so as to lock the first battery assembly to the base member; and
disengage from the first protruding adapter of the base member so as to unlock the first battery assembly such that it can be removed from the base member.

17. The system according to claim 16, wherein the unmanned aerial vehicle comprises a locking mechanism that engages with or disengages from the second protruding adapter of the first battery assembly.

18. The system according to claim 17, wherein the first battery assembly comprises a charging interface that couples with the charging adapter of the base member.

19. The system according to claim 16, further comprising a biasing member that places the locking mechanism in a fail-safe locked configuration when the receiving interface mates with the first protruding adapter.

20. The system according to claim 19, wherein the biasing member comprises a spring.

* * * * *